United States Patent
Krolak et al.

[11] 3,871,462
[45] Mar. 18, 1975

[54] VEHICLE MAIN FRAME

[75] Inventors: Ronald L. Krolak, Metamora; Albert Gianessi, East Peoria; George F. Alexander, Pekin, all of Ill.

[73] Assignee: Caterpillar Tractor Co., Peoria, Ill.

[22] Filed: Mar. 5, 1973

[21] Appl. No.: 338,314

[52] U.S. Cl............ 180/9.5, 180/9.2 R, 180/9.62, 180/70 R
[51] Int. Cl............................................ B62d 55/02
[58] Field of Search............ 180/9.2, 9.62, 70, 9.4, 180/9.5, 9.54, 9.6

[56] References Cited
UNITED STATES PATENTS

| | | | |
|---|---|---|---|
| 1,395,024 | 10/1921 | Wickersham | 180/9.6 |
| 2,091,464 | 8/1937 | Baker | 180/9.6 |
| 2,748,878 | 6/1956 | LeTourneau | 180/70 R X |
| 2,782,656 | 2/1957 | McCarthy | 74/606 |
| 3,266,816 | 8/1966 | Peterson | 180/9.4 X |
| 3,696,879 | 10/1972 | Terai | 180/9.5 |

*Primary Examiner*—Philip Goodman
*Assistant Examiner*—John A. Carroll
*Attorney, Agent, or Firm*—Caterpillar Tractor Co.

[57] ABSTRACT

A vehicle main frame having a longitudinal axis is subjected to relatively high loads in a pair of spaced essentially vertical planes disposed substantially parallel to the longitudinal axis and is supported by ground-engaging driving members through driving-member pivot bearings. The vehicle main frame includes a housing having an axis oriented transversely of the longitudinal axis of the frame and opposite ends. A pair of elongated sidewalls of the frame are disposed in laterally spaced substantially parallel relation which are individually rigidly secured in embracing relation to the opposite ends of the housing and have portions radially outwardly extended therefrom within the vertical planes for accommodating the high loads, the sidewalls being associated directly with the driving-member pivot bearings for substantially directly transmitting the high loads to the ground-engaging driving members in generally load-bypassing relation to the housing to minimize distortion of the housing.

14 Claims, 6 Drawing Figures

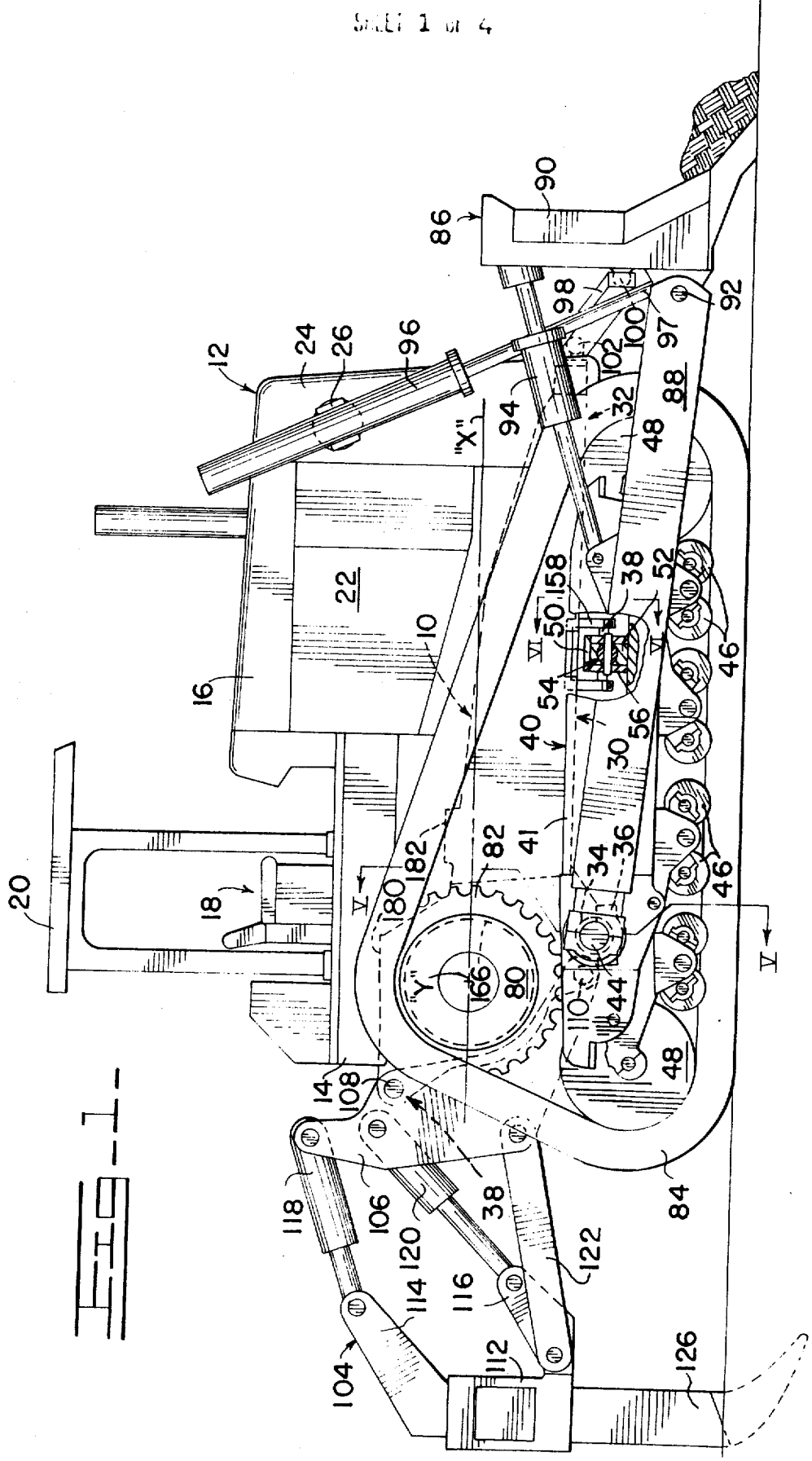

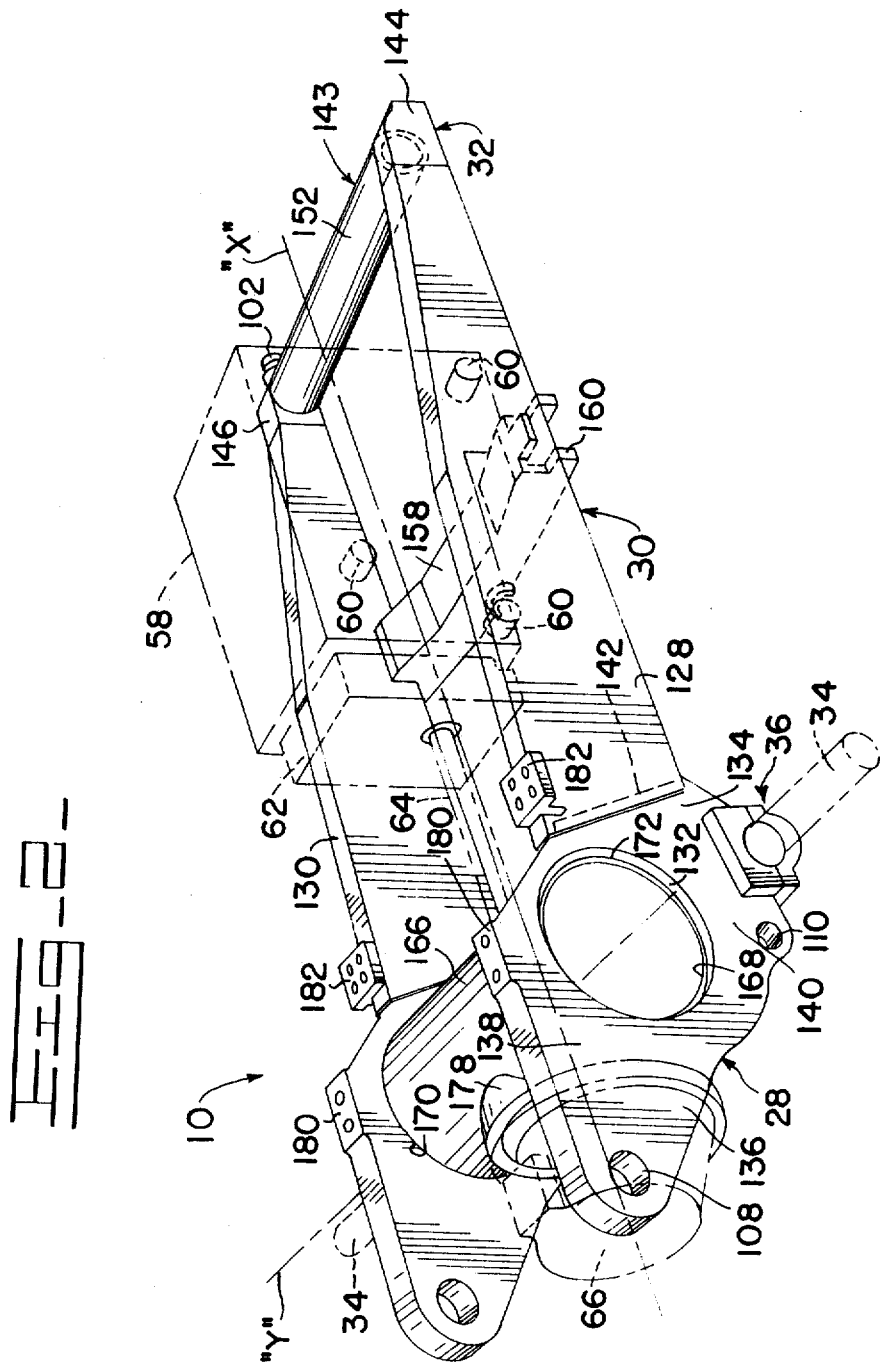

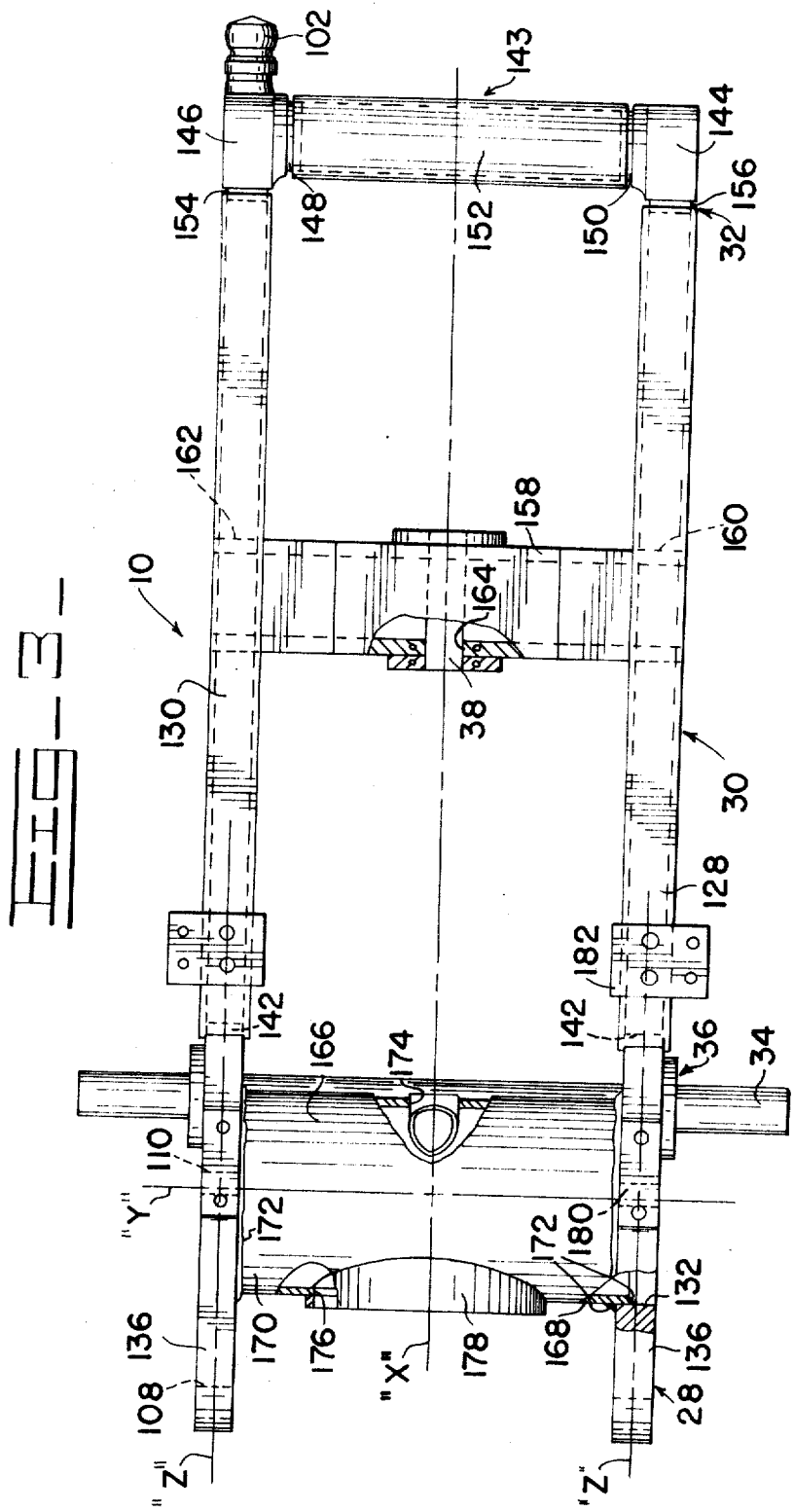

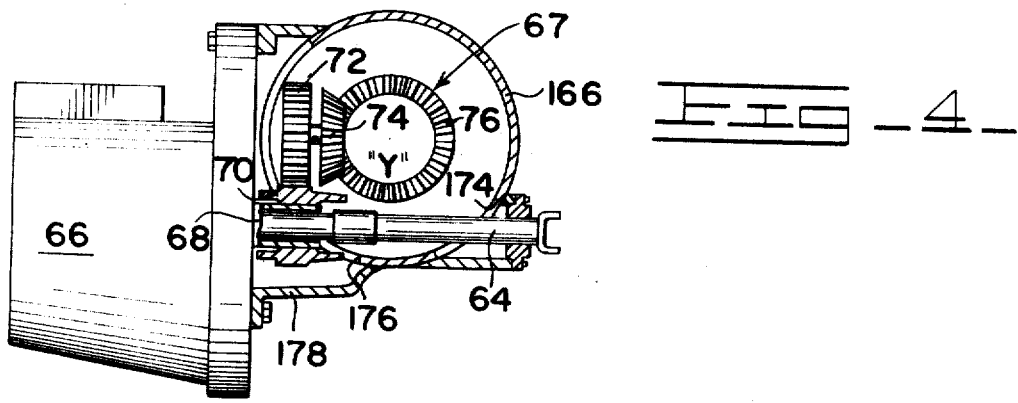
Fig-4-
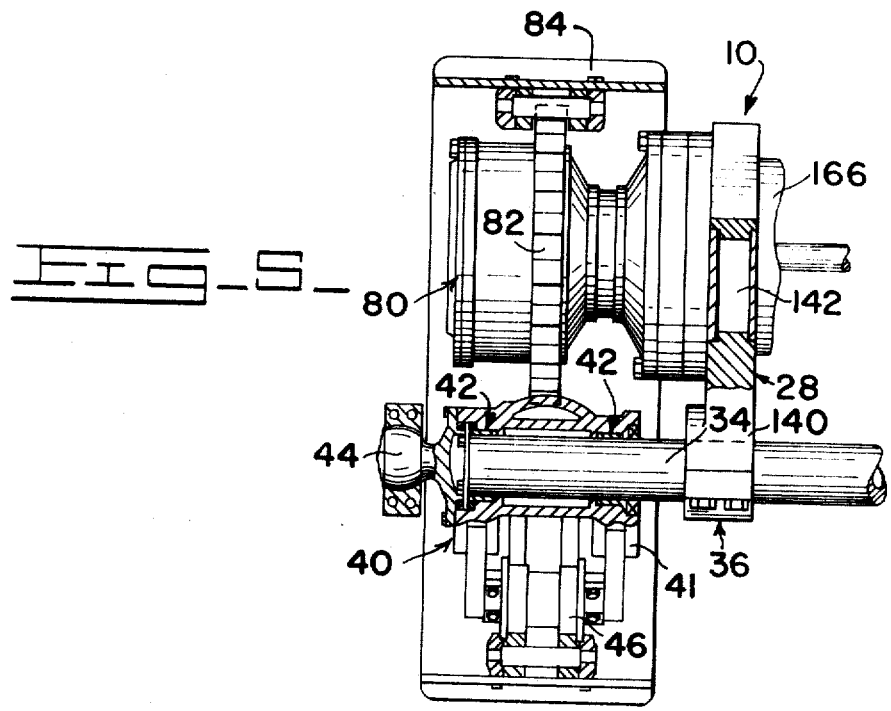
Fig-5-
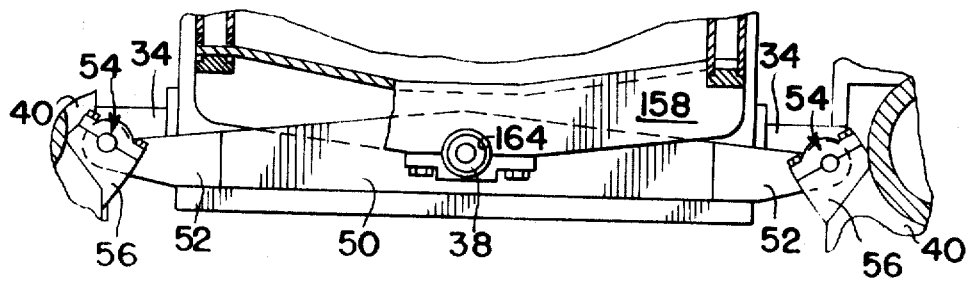
Fig-6-

VEHICLE MAIN FRAME

BACKGROUND OF THE INVENTION

Conventional earthmoving equipment, both track-type and wheel-type vehicles, have incorporated cross drive mechanisms within boxlike cases which require expensive fabrication thereof. Such a boxlike case is normally built up from a large number of separate parts which are welded together in a manner requiring extensive lengths and multiple passes of weld beads which are subject to cracking during operation of the vehicle. Longitudinally extending beams are secured to the case in order to support the power-transmitting elements of the vehicle, and after this is accomplished, almost as an afterthought, consideration is given to mounting various implements on this frame.

The gear case shown in U.S. Pat. 2,782,656, assigned to the assignee of the present invention, is representative of these fabricated boxlike cases which require considerable welding. When implements, such as an earthmoving ripper attachment, are secured to the rear face of such a case, the walls of the case are subjected to extreme stresses which strain the various joints and particularly the welds thereof. Cracking of the joints and seepage of oil contained within the case to the external surfaces subsequently occurs. Such indiscriminate heavy loading not only adversely affects the joints of the case but also distorts the cross drive mechanism support bearings disposed within it. Thus, the cross drive mechanism and its support bearings are exposed to adverse loading which results in premature failure of these components. Servicing of the cross drive mechanism is extremely difficult because the mechanism is usually buried so deeply within the supporting case that it is not easily accessible and requires the prior removal of a relatively large number of other associated components.

SUMMARY AND OBJECTS OF THE INVENTION

Accordingly, it is an object of this invention to provide an improved vehicle main frame which is able positively to transmit the loads acting thereon through predetermined paths while being relatively simple and economical in construction.

Another object of this invention is to provide such an improved vehicle main frame that is effective substantially to separate the high load-transmitting functions of the frame from its vehicle drive component housing functions in order substantially to isolate those components from such high loads.

Another object of this invention is to provide a vehicle main frame having a pair of laterally spaced walls arranged substantially directly to transmit the principal high loads experienced by the vehicle with the walls being connected to the opposite ends of a tubular power train receiving housing that is essentially relieved from the task of transmitting such loads.

Other objects and advantages of the present invention will become more readily apparent upon reference to the accompanying drawings and following description.

BRIEF DESCRIPTION OF THE DRAWINGS

FIG. 1 is a side elevational view of a track-type tractor embodying the vehicle main frame of the subject invention and including both front and rear mounted implements thereon.

FIG. 2 is a three dimensional view of the vehicle main frame of the subject invention with portions of a power plant and a power train shown in broken lines for illustrative purposes.

FIG. 3 is a top plan view of the vehicle main frame of the subject invention.

FIG. 4 is a fragmentary, longitudinal vertical section through the housing portion of the vehicle main frame showing the relationship of certain power train components with respect thereto.

FIG. 5 is a fragmentary, transverse, substantially vertical section of the vehicle main frame of the subject invention and rear support structure therefor taken along the line V—V of FIG. 1.

FIG. 6 is a fragmentary, transverse vertical section of the front support structure for the vehicle main frame of the subject invention taken along the line VI—VI of FIG. 1.

DESCRIPTION OF THE PREFERRED EMBODIMENT

With reference to FIG. 1, a vehicle main frame shown generally by the reference numeral 10 is incorporated in a track-type earthmoving vehicle or tractor 12. Upwardly supported by the main frame are a rearwardly disposed superstructure 14 and a forwardly disposed superstructure 16. Above the rear superstructure is an operation station 18 essentially surrounded by a combination canopy and roll-over protection structure 20. The forward superstructure encases an engine compartment shown generally by the reference numeral 22, and includes a cross frame 24 at the forward portion thereof which serves as a radiator guard and an implement mount as by a pair of laterally spaced, outwardly oriented, universal joints 26.

The vehicle main frame 10, shown in more detail in FIGS. 2, 3, and 5, generally includes a rear portion 28, a central portion 30, and a front portion 32. The main frame is preferably supported rearwardly thereof by a laterally extending cylindrical support shaft 34 having opposite ends individually clamped to the rearward portion 28 of the frame by a cap-retaining system 36, or is alternately supported by a pair of transversely spaced, but axially aligned stub-shafts clamped in substantially the same manner. The main frame is supported forwardly thereof by a central, substantially longitudinally oriented support shaft 38.

A pair of similar, laterally spaced undercarriages 40, individually providing a track roller frame 41, are disposed on opposite sides of the main frame 10 for pivotal movement in essentially vertically oriented planes through the transversely disposed support shafts 34 on a support bearing arrangement 42 as representatively shown in FIG. 5. An implement mounting ball joint 44 is removably secured to each undercarriage in outwardly extending, axially aligned relation to the support shaft 34. Each track roller frame mounts thereon a plurality of track rollers 46, and sets of front and rear idler wheels 48.

As shown in FIGS. 1 and 6, an equalizer bar 50 is pivotally mounted on the central support shaft 38 which is fixed with respect to the vehicle main frame 10 for oscillation in a generally vertical transverse plane. The bar has opposite outer ends 52 which are individually supported on a ball joint 54 contained in a mounting bracket 56 on each undercarriage 40.

As shown in broken lines in FIG. 2, and engine 58 is removably secured to the vehicle main frame 10 by a plurality of resilient mounts 60 in a conventional manner. Power from the engine is directed rearwardly through a torque converter 62, a drive line 64, and into a rear mounted transmission 66. As shown in FIG. 4, a cross drive mechanism shown generally by the reference numeral 67 includes an output shaft 68 from the transmission, driven intermeshing gears 70 and 72, a pinion 74 axially connected to the gear 72, and into a bevel gear 76 driven by the pinion. The gears 70, 72, 74, and 76 are suitably supported within the main frame and deliver power outwardly from the bevel gear 76 to a pair of oppositely spaced final drives 80, one of which is shown in FIG. 5. A drive sprocket 82 is driven by each final drive and powers a ground-engaging driving member or endless track chain assembly 84 which is trained about the sprocket, the track rollers 46, and the idler wheels 48 to drive the vehicle 12.

With reference to FIG. 1, a front-mounted implement 86 such as an earthmoving bulldozer is mounted on the undercarriages 40 through the ball joints 44 and is connected to the cross frame 24 through the universal joints 26. More particularly, the bulldozer includes a pair of laterally spaced push arms 88 which are rearwardly individually pivotally secured to their associated ball joints 44 and are forwardly individually pivotally secured to a bulldozer blade 90 at laterally spaced joints 92. The blade is held in a generally upright position by a conventional tilt brace 94 disposed between each push arm and the blade, and is vertically positioned by a pair of spaced lifting jacks 96 which are mounted in the respectively associated universal joints 26 and include rod ends 97 individually pivotally attached to the blade. A link 98 disposed between a ball joint 100 secured to the blade and a ball joint 102 secured to the front of the main frame 10 laterally stabilizes the bulldozer 86.

A rear-mounted implement 104 such as an earthmoving ripper is removably secured to the rear portion 28 of the main frame 10 through two pairs of laterally spaced, substantially upright mounting plates 106 secured thereto at fixed pin joints 108 and 110. A transverse beam 112, having forwardly extending arms 114 and 116 secured thereto, is positionable with respect to the ground and the mounting plates through two pairs of extendible cylinders 118 and 120 which are pivotally supported intermediate the arms and mounting plates. A pair of laterally spaced links 122 are pivotally secured intermediate the mounting plates and the beam for load-carrying purposes, while one or more ripper teeth 126 which are removably secured within the beam 112 are engaged with the earth for ripping thereof as the vehicle 12 is moved in the forward direction.

The vehicle main frame 10 of the subject invention, which is shown more specifically in FIGS. 2 and 3, has a longitudinal axis "X" and a transverse axis "Y". The main frame includes a pair of elongated sidewalls 128 and 130 which are disposed in outwardly substantially symmetrically spaced, substantially parallel relation to the longitudinal axis "X". These sidewalls are disposed in essentially vertical planes as represented by the letters "Z" in FIG. 3. At the rearward portion 28 of the main frame, each sidewall is of solid plate construction and has an aperture 132 formed therein which is substantially concentrically aligned with the transverse axis "Y". A forward body portion 134, a rearward body portion 136, an upwardly extending body portion 138, and a downwardly extending body portion 140 are integrally related in solid plate, radially outwardly extending relation from each aperture. On the other hand, from the central portion 30 of the main frame 10 and extending toward the forward portion 32 thereof, each elongated sidewall is fabricated in a forwardly tapering box-beam configuration which is individually secured to a projection 142 on its associated solid forward body portion 134, as by welding or the like.

The forward portion 32 of the main frame 10 includes a transverse frame 143 having a pair of laterally spaced corner castings 144 and 146 which respectively include inwardly directed cylindrical projections 148 and 150, as shown in FIG. 3, adapted to be received within a cylindrical cross beam 152. The corner castings further include rearwardly extending rectangular projections 154 and 156 that are received within the boxlike beam sections of the sidewalls 128 and 130. The interfitting connections afforded by the projections 142, 148, 150, 154, and 156 thus provide an extremely strong set of joints when welding is completed about the peripheries thereof.

Centrally of the sidewalls 128 and 130 is a transversely arranged front support structure or saddle 158 having opposite outer ends 160 and 162 which are secured to the sidewalls as by welding or the like. The saddle includes a pair of aligned bores 164 adapted to receive the central support shaft 38 which allows transverse oscillation of the equalizer bar 50 therewithin as shown in FIG. 6.

As shown in FIGS. 2 and 3, the rearward portion 28 of the main frame 10 includes a relatively large diameter tubular housing 166 having outwardly disposed opposite ends 168 and 170 which is concentrically arranged with the transverse axis "Y". Thee opposite ends of the tubular housing are received within the apertures 132 of the sidewalls 128 and 130 and are secured to their respective solid plate body portions 134, 136, 138, and 140 as by peripheral welds 172.

As stated above, the main frame 10 and particularly the tubular housing 166 supportably contains the cross drive mechanism 67 shown in FIG. 4 which is generally disposed along the transverse axis "Y". The tubular housing is provided with a radially disposed ingress opening 174 adapted to receive the drive line 64, and further includes a rearwardly facing opening 176 and an annular mounting flange 178 welded about the periphery thereof to which the rear mounted transmission 66 is removably secured. it is to be noted that the tubular housing and the rearwardly extending body portions 136 of the sidewalls 128 and 130 form a rearwardly facing U-shaped pocket which serves to protect the transmission from damage while still allowing convenient access for servicing purposes.

As shown in FIG. 2, an upwardly facing rear mounting pad 180 is integrally associated with each of the upwardly extending body portions 138, while a forwardly disposed mounting pad 182 is weldably attached to each sidewall for supporting the superstructure 14.

OPERATION

While the construction of the present invention is believed clearly apparent from the foregoing description, further amplification will subsequently be made in the following brief summary of such operation.

With the ripper teeth 126 engaged in the ground as shown in FIG. 1 and the vehicle 12 powerably driven in the forward direction by rotation of the sprockets 82, extremely heavy loads are imposed upon the two pairs of ripper mounting plates 106, with each pair straddlingly embracing the individual sidewalls 128 and 130. These loads act directly on the rearwardly disposed solid plate body portions 134, 136, 138, and 140 of the sidewalls at the fixed pin connections 108 and 110 as shown in FIG. 2, and along the pair of spaced essentially vertical planes "Z" as shown in FIG. 3. Since the solid plate body portions of each sidewall are in radially outwardly extending relation to the aperture 132 therein, these high loads are substantially directly transferred through the cap-retaining systems 36 to both support shafts 34, the support bearing arrangements 42 as shown in FIG. 5, the undercarriages 40, and the ground-engaging driving members 84 in generally loadbypassing relation to the tubular housing 166. The tubular housing and cross drive mechanism 67 substantially contained therein are thus subjected to only a minimum of distortion, adding to the service life of these components.

The normal operating loads due to the weight of the roll-over protection structure 20 and the rear superstructure 14 are generally transferred to the mounting pads 180 and 182. As shown in FIG. 2, such loads are then transmitted through the solid body portions 134, 136, 138, and 140 of the main frame 10 and to the support shafts 34 essentially as stated above in loadbypassing relation to the tubular housing 166. On the other hand, the normal operating loads due to the weight of the front superstructure 16, the engine 58, and the cross frame 24 act on the elongated sidewalls 128 and 130, and more particularly on the central portions 30 and forward portions 32 of the main frame 10. Such forwardly disposed loads are transmitted generally to the front support structure or saddle 158, the central support shaft 38, and to the equalizer bar 50 as shown in FIG. 6. From the equalizer bar the loads are transmitted substantially equally to the ball joints 54 at the opposite outer ends 52 thereof and to the undercarriages 40.

As may be visualized with respect to FIG. 1, in moving earth the bulldozer 86 also imparts high longitudinal loads through the blade 90, the push arms 88, and directly on the ball joints 44 to the undercarriages 40. Although loading of the shafts 34 occurs, it is to be noted that such loading substantially bypasses the tubular housing 166.

Bulldozer lifting or pryout loads acting in a generally vertical direction and resulting from retraction of the rod ends 97 of the lifting jacks 96 are directed downwardly through the joints 26, the cross frame 24, and to the forward portion 32 of the main frame 10 to which the cross frame is removably attached. From this point these vertical loads are transmitted to the central portion 30 of the main frame and generally downwardly through the saddle 158 to the central pivot shaft 38, the equalizer bar 50, the ball joints 54, and to the undercarriages 40. It is to be noted that the front support structure or saddle 158 acts as a fulcrum when pryout loads are encountered and with the rearwardly disposed outwardly extending support shafts 34 tending to be loaded upwardly. Such rear loading of the main frame 10, however, bypasses the tubular housing 166 as mentioned above.

Lateral loads on the bulldozer blade 90 shown in FIG. 1 are transmitted through the ball joint 100, the link 98, and the ball joint 102 which is integrally secured to the corner casting 146 of the front portion 32 of the main frame 10. Because of the rigid connection of the corner castings 144 and 146 to the transversely disposed cross beam 152 and to the forward extremities of each sidewall 128 and 130, a closed frame structure is provided which is relatively strong while also being lightweight and economical. The lateral loads are therefore transmitted to both sidewalls, through the saddle 158 shown in FIG. 6, the central pivot shaft 38, the equalizer bar 50, the ball joints 54, and to the undercarriages 40. Lateral loads acting on the undercarriages and more particularly the rear portion 28 of the main frame are transmitted through the outwardly extending shafts 34 and the undercarriage support bearing arrangements 42 representatively shown in FIG. 5. Again, these loads are transmitted in a manner to bypass the tubular housing 166.

In view of the foregoing, it is readily apparent that the structure of the present invention provides an improved vehicle main frame having a maximum of structural integrity able positively to transmit loads through predetermined paths substantially bypassing the cross drive containing housing. This minimizes distortion of the housing, the power train support bearings contained therein and generally extends the service life of the frame through a decreased use of extensive lengths of weld required to fabricate the overall structure.

While the invention has been described and shown with particular reference to the preferred embodiments, it will be apparent that variations might be possible that would fall within the scope of the present invention, which is not intended to be limited except as defined in the following claims.

What is claimed is:

1. A vehicle main frame having a longitudinal axis subjected to relatively high loads in a pair of spaced essentially vertical planes disposed substantially parallel to such a frame axis and supported by ground-engaging means through pivot support bearing means, comprising;

housing means having an axis oriented transversely of said frame axis and having outwardly disposed opposite ends; and a pair of elongated sidewalls disposed in laterally spaced substantially parallel relation individually rigidly secured in completely marginally contacting fully embracing relation to said opposite ends of said housing means and having extended portions spaced outwardly from said housing means within said planes to provide a mounting for such pivot support bearing means about which the frame is permitted to pivot relative to the ground-engaging means during vehicle travel and for substantially directly transmitting said high loads to such ground-engaging means in generally loadbypassing relation to said housing means to minimize distortion thereof.

2. The vehicle main frame of claim 1 wherein said ground-engaging means is powerably driven by a cross drive mechanism disposed along said transverse axis of said housing means and substantially contained within said housing means.

3. The vehicle main frame of claim 2 wherein said housing means is a tubular housing substantially supportably containing said cross drive mechanism, and said pair of sidewalls individually provide an aperture therein aligned with said transverse axis for egress of said cross drive mechanism.

4. The vehicle main frame of claim 3 wherein said tubular housing has a radially disposed opening to permit access to said cross drive mechanism.

5. The vehicle main frame of claim 1 wherein said extended portions of said pair of elongated sidewalls are of solid cross section adjacent the opposite ends of said housing means.

6. The vehicle main frame of claim 5 wherein each of said elongated sidewalls further includes a box-beam extension rigidly and longitudinally secured to said solid extended portions.

7. The vehicle main frame of claim 6 further comprising transverse frame means having opposite ends rigidly secured to said box-beam extensions of said sidewalls to provide a relatively strong lightweight closed frame structure.

8. A vehicle main frame, for a vehicle having a longitudinal axis and a transverse axis with the main frame being subjected to high loads in a pair of substantially longitudinally oriented vertical planes, comprising;
   a tubular housing oriented with such a transverse axis and having outwardly disposed opposite ends; and
   a pair of longitudinally extending sidewalls in laterally spaced substantially parallel relation to such a longitudinal axis and individually defining an aperture therein, said sidewalls rigidly and embracingly secured to said opposite ends of said tubular housing with said apertures disposed on said transverse axis whereby said sidewalls substantially directly transmit such high loads in generally load-bypassing relation to said tubular housing to minimize distortion of said tubular housing.

9. The vehicle main frame of claim 8 wherein said longitudinally extending sidewalls individually have a solid rearward portion and a box-beam forward portion secured thereto, said solid rearward portions being rigidly secured to said opposite ends of said tubular housing in radially outwardly extending relation thereto to provide a relatively strong lightweight vehicle frame.

10. The vehicle main frame of claim 9 wherein said box-beam forward portion of each of said sidewalls has a forwardly tapering configuration elevationally decreasing toward the front end thereof.

11. The vehicle main frame of claim 10 including transverse frame means having outwardly disposed opposite ends individually rigidly secured to said forward portions of said sidewalls to provide a strong lightweight closed frame structure.

12. The vehicle main frame of claim 11 wherein said transverse frame means includes a centrally disposed cylindrical cross beam and corner pieces secured to said front ends of said forward portion of said sidewalls.

13. A vehicle main frame, for a track-type vehicle having a longitudinal axis with the main frame being subjected to high implement loads in a pair of substantially laterally spaced longitudinally oriented vertical planes and having a cross drive mechanism disposed along a transverse axis thereof, comprising;
   a tubular housing substantially enclosing such a cross drive mechanism and having opposite ends and a radially disposed access opening to permit drive thereto; and
   a pair of longitudinally extending, laterally spaced sidewalls individually providing an aperture therein rigidly and embracingly secured to said opposite ends of said tubular housing in aligned relation with such a transverse axis and permitting drive outwardly therethrough, said sidewalls adapted to transmit said high implement loads in bypassing relation to said tubular housing in order to minimize distortion thereof.

14. The vehicle main frame of claim 13 including a transmission adapted to be removably secured to said tubular housing diametrically opposite said radially disposed opening and wherein said sidewalls individually include a rearwardly extending body portion forming a rearwardly open U-shaped pocket with said tubular housing which serves to protect the transmission from damage while allowing convenient access thereto for servicing.

* * * * *